(12) United States Patent
Miyauchi et al.

(10) Patent No.: US 7,446,983 B2
(45) Date of Patent: Nov. 4, 2008

(54) MAGNETORESISTIVE ELEMENT, THIN-FILM MAGNETIC HEAD, HEAD GIMBAL ASSEMBLY, AND MAGNETIC DISK DRIVE

(75) Inventors: Daisuke Miyauchi, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 368 days.

(21) Appl. No.: 11/002,814

(22) Filed: Dec. 3, 2004

(65) Prior Publication Data

US 2005/0254179 A1    Nov. 17, 2005

(30) Foreign Application Priority Data

May 13, 2004  (JP)  .............................. 2004-143993

(51) Int. Cl.
  *G11B 5/39*  (2006.01)
  *G11B 5/127*  (2006.01)
(52) U.S. Cl. ................................. 360/324.11
(58) Field of Classification Search ................. 360/324, 360/324.1, 324.11, 324.12
  See application file for complete search history.

(56) References Cited

U.S. PATENT DOCUMENTS

| | | | | |
|---|---|---|---|---|
| 5,880,911 | A * | 3/1999 | Ishihara et al. | 360/324 |
| 5,898,546 | A * | 4/1999 | Kanai et al. | 360/324.1 |
| 6,002,553 | A * | 12/1999 | Stearns et al. | 360/324 |
| 6,055,136 | A * | 4/2000 | Gill et al. | 360/314 |
| 6,275,363 | B1 * | 8/2001 | Gill | 360/324.2 |
| 6,317,297 | B1 * | 11/2001 | Tong et al. | 360/314 |
| 6,407,890 | B1 * | 6/2002 | Gill | 360/314 |
| 6,437,950 | B1 * | 8/2002 | Chau et al. | 360/324.11 |
| 6,611,405 | B1 * | 8/2003 | Inomata et al. | 360/324.2 |
| 6,784,509 | B2 | 8/2004 | Yuasa et al. | |
| 6,807,034 | B2 * | 10/2004 | Hasegawa et al. | 360/324.2 |
| 6,853,521 | B2 * | 2/2005 | Hasegawa et al. | 360/324.11 |

(Continued)

FOREIGN PATENT DOCUMENTS

JP    A 2002-92826    3/2002

(Continued)

OTHER PUBLICATIONS

C. Vouille et al. "Microscopic Mechanisms of Giant Magnetoresistance" Physical Review B, The American Physical Society, vol. 60, No. 9, pp. 6710-6722, Sep. 1, 1999.

*Primary Examiner*—Brian E Miller
(74) *Attorney, Agent, or Firm*—Oliff & Berridge, PLC

(57) ABSTRACT

An MR element comprises: a nonmagnetic conductive layer having two surfaces facing toward opposite directions; a free layer disposed adjacent to one of the surfaces of the nonmagnetic conductive layer, wherein the direction of magnetization in the free layer changes in response to an external magnetic field; and a pinned layer disposed adjacent to the other of the surfaces of the nonmagnetic conductive layer, wherein the direction of magnetization in the pinned layer is fixed. The pinned layer incorporates a first pinned layer, a coupling layer and a second pinned layer. The second pinned layer incorporates first to third magnetic layers each of which is made of a magnetic material. Layered structures each made up of a Cu film, a magnetic film and a Cu film are inserted between the first magnetic layer and the second magnetic layer, and between the second magnetic layer and the third magnetic layer, respectively.

4 Claims, 7 Drawing Sheets

U.S. PATENT DOCUMENTS

| | | | |
|---|---|---|---|
| 6,905,780 B2 * | 6/2005 | Yuasa et al. | 428/611 |
| 6,987,653 B2 * | 1/2006 | Inomata et al. | 360/324.4 |
| 7,038,894 B2 * | 5/2006 | Inomata et al. | 360/324.2 |
| 2001/0004307 A1 * | 6/2001 | Saito et al. | 360/324.12 |
| 2002/0006019 A1 * | 1/2002 | Noma et al. | 360/322 |
| 2002/0048128 A1 * | 4/2002 | Kamiguchi et al. | 360/324.1 |
| 2002/0051380 A1 | 5/2002 | Kamiguchi et al. | |
| 2002/0150791 A1 | 10/2002 | Yuasa et al. | |
| 2002/0191348 A1 * | 12/2002 | Hasegawa et al. | 360/314 |
| 2003/0063415 A1 * | 4/2003 | Hasegawa et al. | 360/324.11 |
| 2003/0090844 A1 | 5/2003 | Shimizu et al. | |
| 2003/0168673 A1 * | 9/2003 | Yuasa et al. | 257/200 |
| 2003/0197984 A1 * | 10/2003 | Inomata et al. | 360/324.2 |
| 2004/0141260 A1 * | 7/2004 | Hasegawa et al. | 360/324.11 |
| 2005/0018366 A1 * | 1/2005 | Sbiaa et al. | 360/324.11 |
| 2005/0099724 A1 * | 5/2005 | Nakamura et al. | 360/125 |
| 2005/0280954 A1 * | 12/2005 | Hasegawa et al. | 360/324.11 |
| 2005/0280955 A1 * | 12/2005 | Hasegawa et al. | 360/324.11 |
| 2005/0280958 A1 * | 12/2005 | Saito et al. | 360/324.12 |
| 2006/0002039 A1 * | 1/2006 | Hasegawa et al. | 360/324.11 |

FOREIGN PATENT DOCUMENTS

| | | |
|---|---|---|
| JP | A 2003-60263 | 2/2003 |
| JP | 2003-152239 | 5/2003 |
| JP | A 2003-133614 | 5/2003 |

* cited by examiner

MAGNETORESISTIVE ELEMENT, THIN-FILM MAGNETIC HEAD, HEAD GIMBAL ASSEMBLY, AND MAGNETIC DISK DRIVE

BACKGROUND OF THE INVENTION

1. Field of the Invention

The present invention relates to a magnetoresistive element and to a thin-film magnetic head, a head gimbal assembly and a magnetic disk drive each incorporating the magnetoresistive element.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements. Recently, developments in read heads using TMR elements have been sought to conform to further improvements in areal recording density.

Typically, a spin-valve GMR element incorporates: a nonmagnetic conductive layer having two surfaces facing toward opposite directions; a free layer disposed adjacent to one of the surfaces of the nonmagnetic conductive layer; a pinned layer disposed adjacent to the other of the surfaces of the nonmagnetic conductive layer; and an antiferromagnetic layer disposed adjacent to one of the surfaces of the pinned layer farther from the nonmagnetic conductive layer. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

Conventional GMR heads have a structure in which a current used for detecting magnetic signals (that is hereinafter called a sense current) is fed in the direction parallel to a plane of each layer making up the GMR element. Such a structure is called a current-in-plane (CIP) structure. In contrast, developments have been made for GMR heads having a structure in which a sense current is fed in the direction perpendicular to a plane of each layer making up the GMR element. Such a structure is called a current-perpendicular-to-plane (CPP) structure. A GMR element used for read heads having the CPP structure is hereinafter called a CPP-GMR element. A GMR element used for read heads having the CIP structure is hereinafter called a CIP-GMR element. A read head incorporating the above-mentioned TMR element has the CPP structure, too.

The CPP-GMR elements have great potential since the CPP-GMR elements have such benefits that the resistance thereof is lower than that of the TMR elements and that a higher output is obtained when the track width is reduced, compared with the CIP-GMR elements.

However, it is impossible to obtain a sufficient magnetoresistive change even if the configuration of layers making up the CIP-GMR element is directly applied to the CPP-GMR element. The major two reasons are as follows. One of the reasons is that, in the CPP-GMR element, the portion that contributes to a magnetoresistive change, that is, the portion made up of the free layer, the pinned layer and the nonmagnetic conductive layer, has a resistance that occupies a small proportion of the resistance of the entire element. The other of the reasons is that, in the CPP-GMR element, a magnetoresistive change is smaller, compared with the CIP-GMR element, the magnetoresistive change resulting from the scattering of electrons depending on the spin at the interface between the magnetic layer and the nonmagnetic layer (that is hereinafter called the interface scattering). That is, in an ordinary GMR element, there are two interfaces each formed between the magnetic layer and the nonmagnetic layer, wherein one of the interfaces is formed between the nonmagnetic conductive layer and the free layer, and the other of the interfaces is formed between the nonmagnetic conductive layer and the pinned layer. Nevertheless, in the CIP-GMR element, a sense current is fed in the direction parallel to the plane of each layer making up the GMR element, so that a sufficient magnetoresistive change resulting from the interface scattering is obtained. In the CPP-GMR element, in contrast, a sense current is fed in the direction perpendicular to the plane of each layer making up the GMR element, so that the interface scattering makes a small contribution to the magnetoresistive change in the GMR element.

In the CPP-GMR element, the scattering of electrons depending on the spin in the magnetic layer (hereinafter called the bulk scattering) makes a great contribution to a magnetoresistive change in the GMR element. Therefore, to obtain a great magnetoresistive change in the CPP-GMR element, it is effective to increase the thickness of each of the free layer and the pinned layer as the magnetic layers. However, if the thickness of the free layer is increased, there arises a problem that the direction of magnetization in the free layer is hard to change. If the thickness of the pinned layer is increased, there arises a problem that it is difficult to fix the direction of magnetization in the pinned layer firmly enough by means of the antiferromagnetic layer. Therefore, there is a limit to increasing the magnetoresistive change in the CPP-GMR element by increasing the thickness of each of the free layer and the pinned layer.

The Published Unexamined Japanese Patent Application 2003-152239 discloses a technique in which the number of interfaces that create interface scattering is increased by inserting a nonmagnetic metal layer to the free layer or the pinned layer so as to obtain a great magnetoresistive change in the CPP-GMR element. The Published Unexamined Japanese Patent Application 2003-152239 discloses a CPP-GMR element incorporating a free layer having a structure in which ferromagnetic metal layers of CoFeB and nonmagnetic metal layers of Cu are alternately stacked.

The asymmetry between the electric conductivity of the upward spin in the magnetic layer and the electric conductivity of the downward spin in the magnetic layer is indicated by bulk scattering coefficient $\beta$. To be specific, the bulk scattering coefficient $\beta$ is expressed by the following equation where the electric conductivity of the upward spin in the magnetic layer is $\sigma_b \uparrow$ and the electric conductivity of the downward spin in the magnetic layer is $\sigma_b \downarrow$.

$$\beta = (\sigma_b \uparrow - \sigma_b \downarrow)/(\sigma_b \uparrow + \sigma_b \downarrow)$$

Similarly, the asymmetry between the electric conductivity of the upward spin at the interface between the magnetic layer and the nonmagnetic layer and the electric conductivity of the downward spin at the interface is indicated by interface scattering coefficient $\gamma$. To be specific, the interface scattering coefficient $\gamma$ is expressed by the following equation where the electric conductivity of the upward spin at the interface is $\sigma_i \uparrow$ and the electric conductivity of the downward spin at the interface is $\sigma_i \downarrow$.

$$\gamma=(\sigma_i \uparrow - \sigma_i \downarrow)/(\sigma_i \uparrow + \sigma_i \downarrow)$$

The magnetoresistive change increases as the absolute value of the bulk scattering coefficient $\beta$ increases. Similarly, the magnetoresistive change increases as the absolute value of the interface scattering coefficient $\gamma$ increases. However, if the positive or negative sign of the bulk scattering coefficient $\beta$ of a specific magnetic layer is different from the positive or negative sign of the interface scattering coefficient $\gamma$ at the interface between the magnetic layer and the nonmagnetic layer, the magnetoresistive change caused by the bulk scattering and the magnetoresistive change caused by the interface scattering cancel out each other.

The bulk scattering coefficient $\beta$ depends on the material making the magnetic layer. The interface scattering coefficient $\gamma$ depends on the combination of the material making the magnetic layer and the material making the nonmagnetic layer. The bulk scattering coefficients $\beta$ and the interface scattering coefficients $\gamma$ determined for various materials are disclosed in Physical Review B, the United States, the American Physical Society, Sep. 1, 1999, vol. 60, no. 9, pp. 6710-6722.

The Published Unexamined Japanese Patent Application 2003-152239 discloses that the free layer preferably has a structure in which two to three ferromagnetic metal layers each having a thickness of about 1 to 2 nm are stacked, a nonmagnetic metal layer being provided between the ferromagnetic metal layers. This publication discloses a free layer having a structure in which ferromagnetic metal layers each having a specific thickness and nonmagnetic metal layers each having a specific thickness are alternately stacked. However, in such a structure, if each of the ferromagnetic metal layers is made to have a thickness of about 1 to 2 nm so as to have desired magnetic properties, there arises a problem that the thickness of the entire free layer is increased and the direction of magnetization in the free layer is hard to change. If the pinned layer has a such a structure that the ferromagnetic metal layers each having a specific thickness and the nonmagnetic metal layers each having a specific thickness are alternately stacked, there arises a problem that the thickness of the entire pinned layer is increased and it is difficult to fix the direction of magnetization in the pinned layer firmly enough by means of the antiferromagnetic layer.

OBJECT AND SUMMARY OF THE INVENTION

It is an object of the invention to provide a magnetoresistive element and a thin-film magnetic head, a head gimbal assembly and a magnetic disk drive each incorporating the magnetoresistive element for obtaining a great magnetoresistive change when a current is fed in the direction perpendicular to the plane of each layer making up the magnetoresistive element.

A magnetoresistive element of the invention comprises: a nonmagnetic conductive layer having two surfaces facing toward opposite directions; a free layer disposed adjacent to one of the surfaces of the nonmagnetic conductive layer, wherein the direction of magnetization in the free layer changes in response to an external magnetic field; and a pinned layer disposed adjacent to the other of the surfaces of the nonmagnetic conductive layer, wherein the direction of magnetization in the pinned layer is fixed. According to the invention, at least one of the free layer and the pinned layer incorporates: first and second magnetic layers each of which is made of a magnetic material; a first nonmagnetic film disposed between the first and second magnetic layers and adjacent to the first magnetic layer; a second nonmagnetic film disposed between the first and second magnetic layers and adjacent to the second magnetic layer; and a magnetic film disposed between the first and second nonmagnetic films and touching the first and second nonmagnetic films. Each of the first and second nonmagnetic films is made of copper. The magnetic film is made of a magnetic material containing any of cobalt, nickel and iron, and has a thickness greater than zero and smaller than or equal to 0.5 nm.

In the magnetoresistive element of the invention, interfaces each having a great interface scattering coefficient are formed between the first nonmagnetic film and the first magnetic layer, between the first nonmagnetic film and the magnetic film, between the second nonmagnetic film and the second magnetic layer, and between the second nonmagnetic film and the magnetic film, respectively. As a result, in the magnetoresistive element of the invention, a great magnetoresistive change is obtained when a current is fed in the direction perpendicular to the planes of the layers making up the magnetoresistive element. According to the invention, since the magnetic film has a thickness greater than zero and smaller than or equal to 0.5 nm, it is possible that the first and second magnetic layers have sufficient thicknesses for obtaining a desired magnetic property, without much increasing the entire thickness of the free layer or the pinned layer.

In the magnetoresistive element of the invention, each of the first and second nonmagnetic films may have a thickness greater than zero and smaller than or equal to 0.5 nm.

In the magnetoresistive element of the invention, each of the first and second magnetic layers may have a thickness that falls within a range of 1 to 2 nm inclusive.

In the magnetoresistive element of the invention, the magnetic film may be made of a cobalt-manganese alloy.

In the magnetoresistive element of the invention, the magnetic film may be made of a cobalt-iron alloy or a nickel-iron alloy.

A thin-film magnetic head of the invention comprises: a medium facing surface that faces toward a recording medium; the magnetoresistive element of the invention disposed near the medium facing surface to detect a signal magnetic field sent from the recording medium; and a pair of electrodes for feeding a current for detecting magnetic signals to the magnetoresistive element in the direction perpendicular to planes of layers making up the magnetoresistive element.

A head gimbal assembly of the invention comprises: a slider including the thin-film magnetic head of the invention and disposed to face toward a recording medium; and a suspension flexibly supporting the slider.

A magnetic disk drive of the invention comprises: a slider including the thin-film magnetic head of the invention and disposed to face toward a circular-plate-shaped recording medium that is rotated and driven; and an alignment device supporting the slider and aligning the slider with respect to the recording medium.

According to the magnetoresistive element, the thin-film magnetic head, the head gimbal assembly, or the magnetic disk drive of the invention, interfaces generating interface scattering are formed between the first nonmagnetic film and the first magnetic layer, between the first nonmagnetic film and the magnetic film, between the second nonmagnetic film and the second magnetic layer, and between the second nonmagnetic film and the magnetic film, respectively. As a result, according to the invention, a great magnetoresistive change is obtained when a current is fed in the direction perpendicular to the planes of the layers making up the magnetoresistive element. According to the invention, since the magnetic film has a thickness greater than zero and smaller than or equal to 0.5 nm, it is possible that the first and second magnetic layers have sufficient thicknesses for obtaining a desired magnetic property, without much increasing the entire thickness of the free layer or the pinned layer.

Other and further objects, features and advantages of the invention will appear more fully from the following description.

DETAILED DESCRIPTION OF THE PREFERRED EMBODIMENTS

Preferred embodiments of the invention will now be described in detail with reference to the accompanying drawings.

First Embodiment

Figure 3:
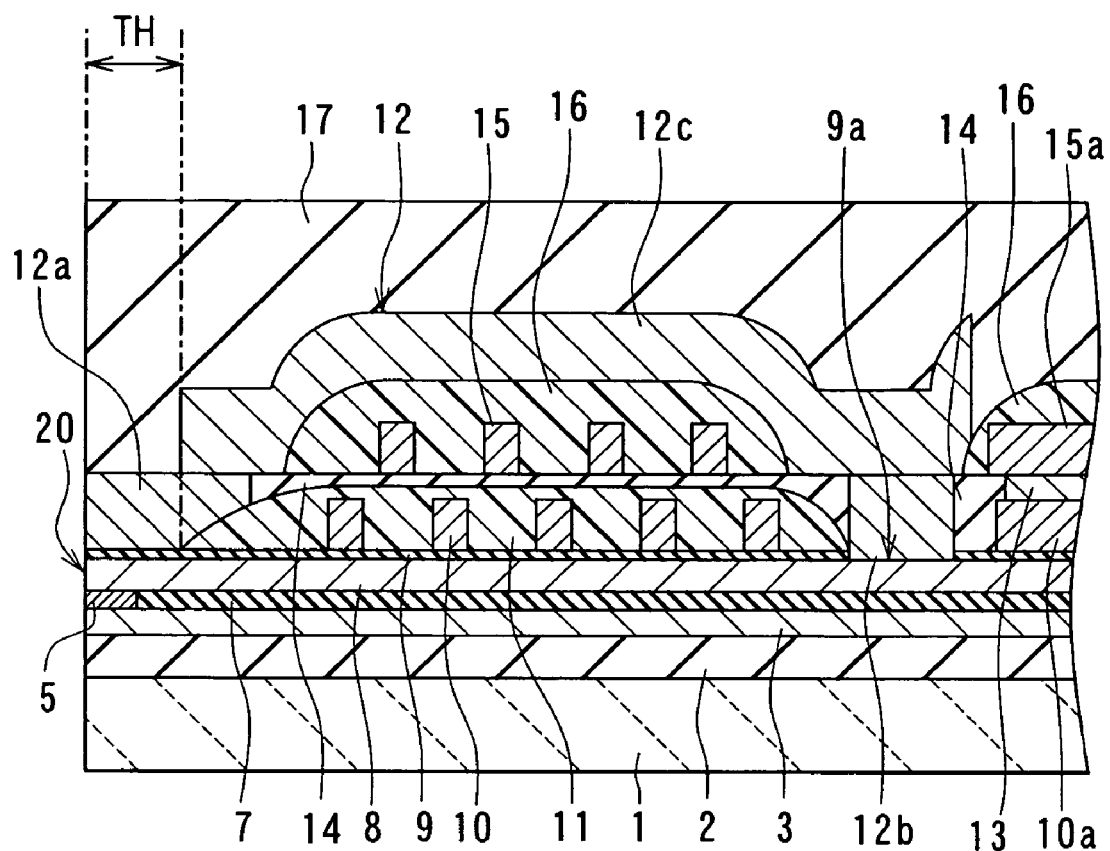
FIG. 3 is a cross-sectional view of a thin-film magnetic head of the first embodiment of the invention, wherein the cross section is orthogonal to the air bearing surface and the substrate.
Figure 4:
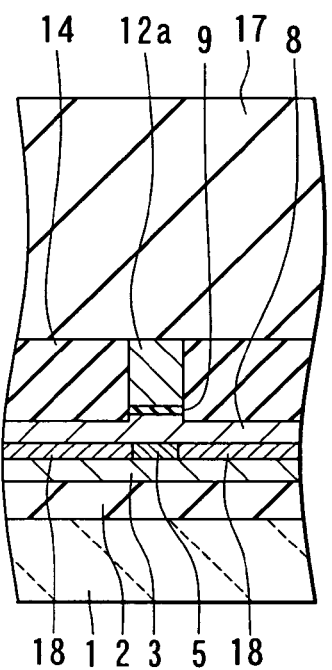
FIG. 4 is a cross-sectional view of a pole portion of the thin-film magnetic head of the first embodiment of the invention, wherein the cross section is parallel to the air bearing surface.

Reference is now made to FIG. 3 and FIG. 4 to describe the outlines of the configuration and a manufacturing method of a thin-film magnetic head of a first embodiment of the invention. FIG. 3 illustrates a cross section of the thin-film magnetic head orthogonal to the air bearing surface and a substrate. FIG. 4 illustrates a cross section of a pole portion of the thin-film magnetic head parallel to the air bearing surface.

In the method of manufacturing the thin-film magnetic head of the embodiment, first, an insulating layer 2 made of an insulating material such as alumina ($Al_2O_3$) and having a thickness of 1 to 5 µm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by chemical mechanical polishing (CMP), for example, so that the first shield layer 3 is exposed, and the top surfaces of the first shield layer 3 and the insulating layer are thereby flattened.

Next, an MR element 5 for reading is formed on the first shield layer 3. Next, although not shown, an insulating film is formed to cover two sides of the MR element 5 and the top surface of the first shield layer 3. The insulating film is made of an insulating material such as alumina. Next, two bias field applying layers 18 are formed such that the layers 18 are adjacent to the two sides of the MR element 5 with the insulating film disposed between the MR element 5 and each of the layers 18. Next, an insulating layer 7 is formed to be disposed around the MR element 5 and the bias field applying layers 18. The insulating layer 7 is made of an insulating material such as alumina.

Figure 11:
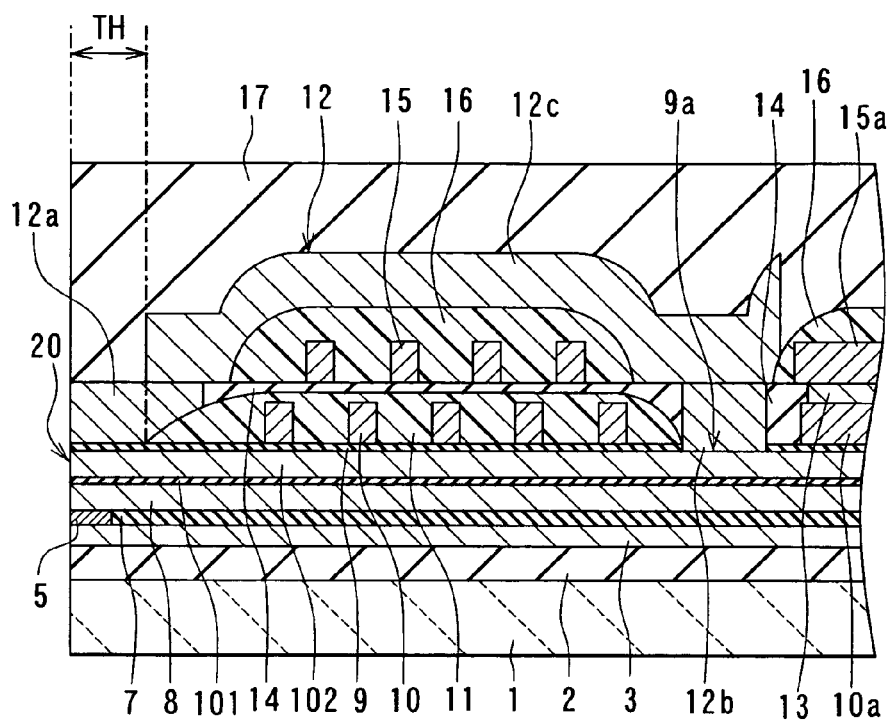
FIG. 11 is a cross-sectional view of a thin-film magnetic head of a modification example of the first embodiment of the invention, wherein the cross section is orthogonal to the air bearing surface and the substrate.
Figure 12:
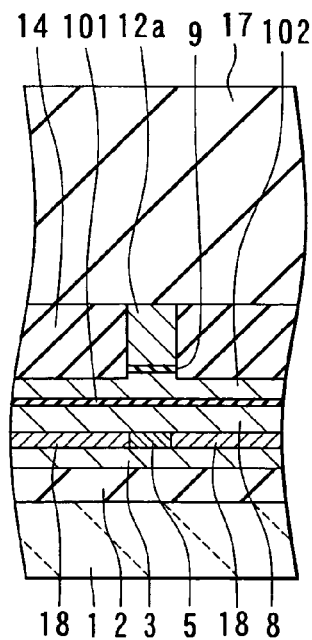
FIG. 12 is a cross-sectional view of a pole portion of the thin-film magnetic head of the modification example of the first embodiment of the invention, wherein the cross section is parallel to the air bearing surface.

Next, a second shield layer 8 for the read head is formed on the MR element 5, the bias field applying layers 18 and the insulating layer 7. The second shield layer 8 is made of a magnetic material and also functions as a bottom pole layer of a write head. The second shield layer 8 is made of a soft magnetic material such as NiFe, CoFe, CoFeNi or FeN. The second shield layer 8 is formed by plating or sputtering, for example. Alternatively, as shown in FIG. 11 and FIG. 12, a second shield layer 8 that does not function as the bottom pole layer, a separating layer 101 and a bottom pole layer 102 may be provided in place of the second shield layer 8 that also functions as the bottom pole layer. The separating layer 101 is made of a nonmagnetic material such as alumina and formed by sputtering, for example, on the second shield layer 8 that does not function as the bottom pole layer. The bottom pole layer 102 is formed on the separating layer 101.

Next, a write gap layer 9 made of an insulating material such as alumina and having a thickness of 50 to 300 nm, for example, is formed on the second shield layer 8 (or the bottom pole layer 102) by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 µm, for example, is formed on the write gap layer 9. In FIG. 3 numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat processing is performed at a specific temperature to flatten the surface of the insulating layer 11. Through this heat processing, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to an air bearing surface 20 described later toward the air bearing surface 20. The top pole layer 12 is made up of the track width defining layer 12a, and a coupling portion layer 12b and a yoke portion layer 12c that will be described later.

The track width defining layer 12a has: a tip portion that is formed on the write gap layer 9 and functions as the pole portion of the top pole layer 12; and a connecting portion that is formed on the sloped portion of the insulating layer 11 closer to the air bearing surface 20 and connected to the yoke portion layer 12c. The tip portion has a width equal to the write track width. The connecting portion has a width greater than that of the tip portion.

When the track width defining layer 12a is formed, the coupling portion layer 12b made of a magnetic material is formed in the contact hole 9a and a connecting layer 13 made of a magnetic material is formed on the connecting portion 10a at the same time. The coupling portion layer 12b makes up a portion of the top pole layer 12 that is magnetically coupled to the second shield layer 8 (or the bottom pole layer 102).

Next, pole trimming is performed. That is, in a region around the track width defining layer 12a, the write gap layer 9 and at least a portion of the pole portion of the second shield layer 8 (or the bottom pole layer 102) close to the write gap layer 9 are etched, using the track width defining layer 12a as a mask. As a result, as shown in FIG. 4, a trim structure is formed, wherein the pole portion of the top pole layer 12, the write gap layer 9 and at least a portion of the pole portion of the second shield layer 8 (or the bottom pole layer 102) have equal widths. The trim structure has an effect of preventing an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 3 numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat processing is performed at a specific temperature to flatten the surface of the insulating layer 16. Through this heat processing, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. The yoke portion layer 12c has an end disposed on a side of the air bearing surface 20, the end being located at a distance from the air bearing surface 20. The yoke portion layer 12c is connected to the second shield layer 8 (or the bottom pole layer 102) through the coupling portion layer 12b.

Next, an overcoat layer 17 made of alumina, for example, is formed to cover the entire surface. Finally, machining of the slider including the foregoing layers is performed to form the air bearing surface 20 of the thin-film magnetic head including the write head and the read head. The thin-film magnetic head is thus completed.

The thin-film magnetic head thus manufactured comprises the air bearing surface 20 as the medium facing surface that faces toward a recording medium, the read head and the write head. The configuration of the read head will be described in detail later.

The write head incorporates the bottom pole layer (the second shield layer 8 or the bottom pole layer 102) and the top pole layer 12 that are magnetically coupled to each other and include the pole portions that are opposed to each other and placed in regions on a side of the air bearing surface 20. The write head further incorporates: the write gap layer 9 provided between the pole portion of the bottom pole layer and the pole portion of the top pole layer 12; and the thin-film coil including the portions 10 and 15 at least part of which is placed between the bottom pole layer and the top pole layer 12 and insulated from the bottom pole layer and the top pole layer 12. In the thin-film magnetic head, as shown in FIG. 3, throat height TH is the length from the air bearing surface 20 to the end of the insulating layer 11 closer to the air bearing surface 20. The throat height is the length (height) from the air bearing surface 20 to the point at which the distance between the two pole layers starts to increase.

Figure 1:
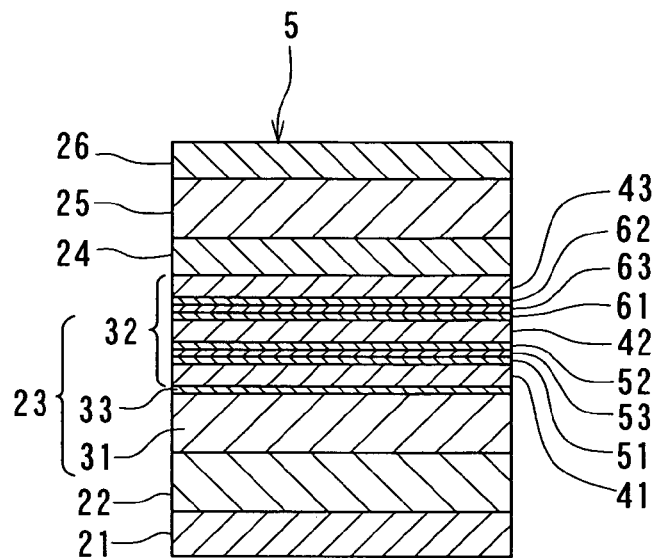
FIG. 1 is a cross-sectional view illustrating the configuration of layers of an MR element of a first embodiment of the invention.
Figure 2:
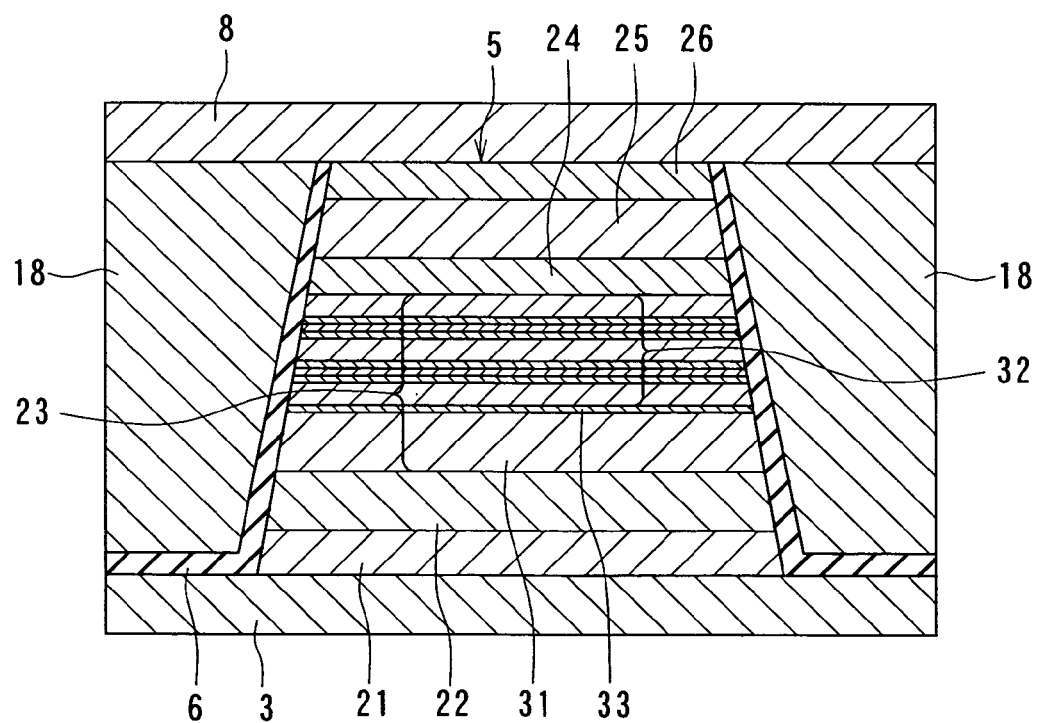
FIG. 2 is a cross-sectional view of a read head of the first embodiment of the invention, wherein the cross section is parallel to the air bearing surface.

Reference is now made to FIG. 1 and FIG. 2 to describe the details of the configuration of the read head. FIG. 1 is a cross-sectional view illustrating the configuration of layers of the MR element. FIG. 2 is a cross-sectional view of the read head parallel to the air bearing surface.

As shown in FIG. 2, the read head of the embodiment comprises: the first shield layer 3 and the second shield layer 8 disposed at a specific distance from each other; the MR element 5 disposed between the first shield layer 3 and the second shield layer 8; the insulating film 6 covering the two sides of the MR element 5 and the top surface of the first shield layer 3; and the two bias field applying layers 18 that are disposed adjacent to the two sides of the MR element 5 with the insulating film 6 disposed between the MR element 5 and the bias field applying layers 18. The insulating film 6 is made of alumina, for example. The bias field applying layers 18 are each made of a hard magnetic layer (a hard magnet) or a layered structure made up of a ferromagnetic layer and an antiferromagnetic layer, for example. To be specific, the bias field applying layers 18 are made of CoPt or CoCrPt, for example.

The read head of the embodiment is the one having the CPP structure. The first and second shield layers 3 and 8 also function as a pair of electrodes for feeding a sense current to the MR element 5 in the direction perpendicular to the planes of the layers making up the MR element 5. Alternatively, a pair of electrodes may be provided on the top and bottom of the MR element 5, besides the first and second shield layers 3 and 8. The MR element 5 is a spin-valve GMR element. The MR element 5 has a resistance that changes in response to an external magnetic field, that is, a signal magnetic field sent from a recording medium. The sense current is fed in the direction perpendicular to the planes of the layers making up the MR element 5. It is possible that the resistance of the MR element 5 is obtained from the sense current. In such a manner, the data stored on the recording medium is read by the read head.

As shown in FIG. 1 and FIG. 2, the MR element 5 comprises an underlying layer 21, an antiferromagnetic layer 22, a pinned layer 23, a nonmagnetic conductive layer 24, a free layer 25 and a protection layer 26 that are stacked one by one on the first shield layer 3. The pinned layer 23 is a layer in which the direction of magnetization is fixed. The antiferromagnetic layer 22 is a layer that fixes the direction of magnetization in the pinned layer 23 by means of exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The free layer 25 is made of a soft magnetic layer in which the direction of magnetization changes in response to an external magnetic field, that is, a signal magnetic field sent from the recording medium. The protection layer 26 is a layer for protecting the layers therebelow.

The underlying layer 21 has a thickness of 2 to 6 nm, for example. The underlying layer 21 may be made of a layered structure made up of a Ta layer and an NiFeCr layer, for example.

The antiferromagnetic layer 22 has a thickness of 5 to 30 nm, for example, and may be made of an antiferromagnetic material including Mn and at least one element $M_{II}$ among the group consisting of Pt, Ru, Rh, Pd, Ni, Au, Ag, Cu, Ir, Cr and Fe. The proportion of Mn preferably falls within a range of 35 to 95 atomic % inclusive. The proportion of the other element $M_{II}$ preferably falls within a range of 5 to 65 atomic % inclusive. One type of antiferromagnetic material is a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic materials include an Mn alloy that has a γ phase, such as RuRhMn, FeMn, and IrMn. The heat-induced antiferromagnetic materials include an Mn alloy that has a regular crystal structure, such as PtMn, NiMn, and PtRhMn.

The direction of magnetization is fixed in the pinned layer 23 by means of the exchange coupling at the interface between the antiferromagnetic layer 22 and the pinned layer 23. The pinned layer 23 of the embodiment is a so-called synthetic pinned layer and incorporates a first pinned layer 31, a coupling layer 33 and a second pinned layer 32 that are stacked in this order on the antiferromagnetic layer 22. The first pinned layer 31 and the second pinned layer 32 each include a magnetic layer made of a ferromagnetic material containing at least Co out of the group consisting of Co and Fe, for example. In particular, it is preferred that the (111) plane of this ferromagnetic material is oriented along the direction in which the layers are stacked. An additive such as boron (B) may be added to the material of the first pinned layer 31 and the second pinned layer 32. The first and second pinned layers 31 and 32 are antiferromagnetic-coupled to each other and the directions of magnetization thereof are fixed to opposite directions. The first pinned layer 31 has a thickness of 3 to 7 nm, for example. The second pinned layer 32 has a thickness of 3 to 7 nm, for example.

The coupling layer 33 of the pinned layer 23 has a thickness of 0.2 to 1.2 nm, for example, and may be made of a nonmagnetic material including at least one element among the group consisting of Ru, Rh, Ir, Re, Cr and Zr. The coupling layer 33 is provided for creating antiferromagnetic exchange coupling between the first pinned layer 31 and the second pinned layer 32, and for fixing the magnetizations of the pinned layers 31 and 32 to opposite directions. The magnetizations of the pinned layers 31 and 32 in opposite directions include not only the case in which there is a difference of 180 degrees between these directions of magnetizations, but also the case in which there is a difference of 180±20 degrees between them.

The nonmagnetic conductive layer 24 has a thickness of 1.0 to 4.0 nm, for example, and may be made of a nonmagnetic conductive material that includes 80 weight % or greater of at least one element among the group consisting of Cu, Au and Ag.

The free layer 25 has a thickness of 1.0 to 8.0 nm, for example, and may be made up of a single layer or two layers or more. Here, an example in which the free layer 25 is made up of two soft magnetic layers will be given. One of the two soft magnetic layers that is closer to the nonmagnetic conductive layer 24 is called a first soft magnetic layer. The other one that is closer to the protection layer 26 is called a second soft magnetic layer.

The first soft magnetic layer has a thickness of 0.5 to 3 nm, for example, and may be made of a magnetic material including at least Co among the group consisting of Ni, Co, and Fe. To be specific, the first soft magnetic layer is preferably made of $Co_xFe_yNi_{100-(x+y)}$ in which the (111) plane is oriented along the direction in which the layers are stacked. In the formula, x and y fall within ranges of $70 \leq x \leq 100$ and $0 \leq y \leq 25$, respectively, in atomic percent.

The second soft magnetic layer has a thickness of 0.5 to 8 nm, for example, and may be made of a magnetic material including at least Ni among the group consisting of Ni, Co, Fe, Ta, Cr, Rh, Mo and Nb. To be specific, the second soft magnetic layer is preferably made of $[Ni_xCo_yFe_{100-(x+y)}]_{100-z}M_{Iz}$. In the formula, $M_I$ represents at least one of Ta, Cr, Rh, Mo and Nb, while x, y and z fall within ranges of $75 \leq x \leq 90$, $0 \leq y \leq 15$, and $0 \leq z \leq 15$, respectively, in atomic percent.

The protection layer 26 has a thickness of 0.5 to 10 nm, for example. The protection layer 26 may be a layered structure made up of a Cu layer and a Ta layer, for example.

The layers making up the MR element 5 may be formed by sputtering, for example. In the step of forming the MR element 5, after the layers making up the MR element 5 are formed, annealing (heat processing) is performed in a magnetic field for four hours at a temperature of 270° C., for example, so as to fix the direction of magnetization in the pinned layer 23. The top surface of the MR element 5 has a shape of square that is 0.1 μm long and 0.1 μm wide, for example.

The configuration of the layers of the MR element 5 may be an upside-down one of the configuration shown in FIG. 1 or FIG. 2. The layers of the MR element 5 may have a configuration of dual spin-valve in which, between the free layer 25 and the protection layer 26 of FIG. 1 or FIG. 2, a nonmagnetic conductive layer, a pinned layer and an antiferromagnetic layer that are disposed in this order from the side closer to the free layer 25 are provided. In this case, each of the nonmagnetic conductive layer, the pinned layer and the antiferromagnetic layer provided between the free layer 25 and the protection layer 26 has a configuration the same as that of each of the nonmagnetic conductive layer 24, the pinned layer 23 and the antiferromagnetic layer 22.

The operation of the thin-film magnetic head of the embodiment will now be described. The thin-film magnetic head writes data on a recording medium by using the write head and reads data written on the recording medium by using the read head.

In the read head, the direction of the bias magnetic field created by the bias field applying layers 18 intersects the direction orthogonal to the air bearing surface 20 at a right angle. In the MR element 5, the direction of magnetization of the free layer 25 is aligned with the direction of the bias field when no signal magnetic field exists. The direction of magnetization of the pinned layer 23 is fixed to the direction orthogonal to the air bearing surface 20.

In the MR element 5, the direction of magnetization of the free layer 25 changes in response to the signal field sent from the recording medium. The relative angle between the direction of magnetization of the free layer 25 and the direction of magnetization of the pinned layer 23 is thereby changed. As a result, the resistance of the MR element 5 changes. The resistance of the MR element 5 is obtained from the potential difference between the first and second shield layers 3 and 8 when a sense current is fed to the MR element 5 from the shield layers 3 and 8. In such a manner, the data stored on the recording medium is read by the read head.

The features of the MR element 5 of the embodiment will now be described. The MR element 5 of the embodiment comprises: the nonmagnetic conductive layer 24 having two surfaces facing toward opposite directions; the free layer 25 disposed adjacent to one of the surfaces of the nonmagnetic conductive layer 24, wherein the direction of magnetization in the free layer 25 changes in response to an external magnetic field; and the pinned layer 23 disposed adjacent to the other of the surfaces of the nonmagnetic conductive layer 24, wherein the direction of magnetization in the pinned layer 23 is fixed. The pinned layer 23 of the embodiment incorporates the first pinned layer 31, the coupling layer 33 and the second pinned layer 32. The second pinned layer 32 incorporates three magnetic layers 41, 42 and 43 each of which is made of a magnetic material. The magnetic layer 41 is disposed adjacent to the coupling layer 33. The magnetic layer 43 is disposed adjacent to the nonmagnetic conductive layer 24. The magnetic layer 42 is disposed between the magnetic layers 41 and 43. Each of the magnetic layers 41, 42 and 43 preferably has a thickness that falls within a range of 1 to 2 nm inclusive.

The second pinned layer 32 further incorporates: a nonmagnetic film 51 disposed between the magnetic layers 41 and 42 and adjacent to the magnetic layer 41; a nonmagnetic film 52 disposed between the magnetic layers 41 and 42 and adjacent to the magnetic layer 42; and a magnetic film 53 disposed between the nonmagnetic films 51 and 52 and touching the films 51 and 52. The nonmagnetic films 51 and 52 correspond to the first and second nonmagnetic films of the invention. As for the nonmagnetic films 51 and 52 and the magnetic film 53, the magnetic layer 41 corresponds to the first magnetic layer of the invention, and the magnetic layer 42 corresponds to the second magnetic layer of the invention.

The second pinned layer 32 further incorporates: a nonmagnetic film 61 disposed between the magnetic layers 42 and 43 and adjacent to the magnetic layer 42; a nonmagnetic film 62 disposed between the magnetic layers 42 and 43 and adjacent to the magnetic layer 43; and a magnetic film 63 disposed between the nonmagnetic films 61 and 62 and touching the films 61 and 62. The nonmagnetic films 61 and 62 correspond to the first and second nonmagnetic films of the invention. As for the nonmagnetic films 61 and 62 and the magnetic film 63, the magnetic layer 42 corresponds to the first magnetic layer of the invention, and the magnetic layer 43 corresponds to the second magnetic layer of the invention.

Each of the nonmagnetic films 51, 52, 61 and 62 is made of copper (Cu), and preferably has a thickness greater than 0 and smaller than or equal to 0.5 nm. The nonmagnetic films 51, 52, 61 and 62 may be formed by sputtering, for example. The average thickness of the nonmagnetic films 51, 52, 61 and 62 is preferably 0.05 nm or greater, and more preferably 0.2 nm or greater. The thickness of 0.05 nm is nearly equal to the minimum thickness of each of the nonmagnetic films 51, 52, 61 and 62 that can be formed.

Each of the magnetic films 53 and 63 is made of a magnetic material containing any of cobalt (Co), nickel (Ni) and iron (Fe), and has a thickness greater than 0 and smaller than or equal to 0.5 nm. The magnetic films 53 and 63 may be formed by sputtering, for example. The average thickness of the magnetic films 53 and 63 is preferably 0.05 nm or greater, and more preferably 0.2 nm or greater. The thickness of 0.05 nm is nearly equal to the minimum thickness of each of the magnetic films 53 and 63 that can be formed.

As stated in Physical Review B, the United States, the American Physical Society, Sep. 1, 1999, vol. 60, no. 9, pp. 6710-6722, the interface scattering coefficient $\gamma$ is relatively great at the interface between a film made of Cu and a film made of a magnetic material containing any of Co, Ni and Fe. In the embodiment, such interfaces having a relatively great interface scattering coefficient $\gamma$ are formed between the magnetic layer 41 and the nonmagnetic film 51, between the nonmagnetic film 51 and the magnetic film 53, between the magnetic film 53 and the nonmagnetic film 52, between the nonmagnetic film 52 and the magnetic layer 42, between the magnetic layer 42 and the nonmagnetic film 61, between the nonmagnetic film 61 and the magnetic film 63, between the magnetic film 63 and the nonmagnetic film 62, and between the nonmagnetic film 62 and the magnetic layer 43. As a result, according to the embodiment, a great magnetoresistive change is obtained when a current is fed in the direction perpendicular to the planes of the layers making up the MR element 5.

According to the embodiment, each of the magnetic films 53 and 63 has a thickness greater than 0 and smaller than or equal to 0.5 nm. As a result, it is possible that each of the magnetic layers 41, 42 and 43 has a thickness sufficient for obtaining a desired magnetic property, such as a thickness that falls within a range of 1 to 2 nm inclusive, without much increasing the entire thickness of each of the second pinned layer 32 and the pinned layer 23.

The magnetic films 53 and 63 are preferably made of a cobalt-manganese alloy (hereinafter referred to as CoMn). This is because, as shown in table 1 of the above-mentioned article of Physical Review B, since the interface scattering coefficient $\gamma$ is extremely great at the interface between a CoMn film and a Cu film, the magnetic films 53 and 63 made of CoMn result in a great increase in the interface scattering coefficient $\gamma$ at the interfaces between each of the magnetic films 53 and 63 and the nonmagnetic films 51, 52/61, 62 that are in contact with the magnetic films 53 and 63, respectively. Because of a similar reason, a cobalt-iron alloy (hereinafter referred to as CoFe) or a nickel-iron alloy (hereinafter referred to as NiFe) is a preferred material of the magnetic films 53 and 63.

As shown in table 1 of the above-mentioned article of Physical Review B, the interface scattering coefficient $\gamma$ at the interface between the CoMn film and the Cu film is of a positive value while the bulk scattering coefficient β of the CoMn film is of a negative value. Therefore, if each of the magnetic films 53 and 63 is made of a CoMn film, the magnetoresistive change resulting from interface scattering and the magnetoresistive change resulting from bulk scattering cancel out each other. Consequently, if the CoMn films as the magnetic films 53 and 63 are too thick, the magnetoresistive change of the entire MR element 5 is not much increased and/or the magnetoresistive change resulting from a negative bulk scattering coefficient β becomes dominant even though the number of interfaces each having a great interface scattering coefficient γ has increased. However, according to the embodiment, the CoMn films as the magnetic films 53 and 63 each have a very small thickness that is greater than 0 and smaller than or equal to 0.5 nm, so that the magnetoresistive change resulting from bulk scattering in the CoMn films is very small. Therefore, the magnetoresistive change resulting from bulk scattering in the CoMn films as the magnetic films 53 and 63 is almost negligible, and a great magnetoresistive change is obtained which results from a great interface scattering coefficient γ at the interface between the CoMn film and the Cu film.

The table 1 of the above-mentioned article of Physical Review B shows a value of 50 nm as such a thickness t* (compensation thickness) of the CoMn layer that the magnetoresistive change resulting from bulk scattering in the CoMn layer made up of 95% Co and 5% Mn and the magnetoresistive change resulting from interface scattering at the interface between the CoMn layer and the Cu layer cancel out each other. The CoMn films as the magnetic films 53 and 63 of the embodiment each have a thickness much smaller than the compensation thickness. As a result, according to the embodiment, it is noted that the magnetoresistive change resulting from bulk scattering in the CoMn films as the magnetic films 53 and 63 is almost negligible.

If the magnetic films 53 and 63 are made of CoFe or NiFe, the magnetoresistive change resulting from interface scattering and the magnetoresistive change resulting from bulk scattering do not cancel out each other since the bulk scattering coefficient β of each of the CoFe film and the NiFe film is of a positive value. However, according to the embodiment, the pinned layer 23 is a synthetic pinned layer. It is therefore required to increase the thickness of the first pinned layer 31 if the thicknesses of the magnetic films 53 and 63 in the second pinned layer 32 are increased. An increase in the thickness of the first pinned layer 31 causes disadvantages such as an increase in parasitic resistance, an increase in negative magnetoresistive change caused by the first pinned layer 31, and an increase in the entire thickness of the MR element 5. Therefore, it is not preferred that the magnetic films 53 and 63 are too thick even if the magnetic films 53 and 63 are made of CoFe or NiFe.

The following is a description of the result of experiment performed for making a comparison between specific examples of the MR element 5 of the embodiment and reference examples to be compared with the examples of the embodiment with regard to the MR ratio (the ratio of magnetoresistive change to the resistance). The MR ratio was measured by the four terminal method wherein one of terminals for feeding currents and one of terminals for detecting voltages were connected to the first shield layer 3 while the other of the terminals for feeding currents and the other of the terminals for detecting voltages were connected to the second shield layer 8.

The table below shows the configurations and the MR ratios of the MR elements of the first and second reference examples. In the table, except the first and last rows, the first column indicates the layers making up the MR elements and the second column indicates specific configurations of the layers. In the second column, 'Ta', for example, indicates a Ta layer. The positional relationship among the layers in the second column corresponds to the positional relationship among those in the MR elements. In the table, except the first and last rows, the third column indicates the thickness of each of the layers listed in the second column of the first reference example, and the fourth column indicates the thickness of each of the layers listed in the second column of the second reference example. The thicknesses are given in nanometers (nm). In the table, the last row indicates the MR ratios of the MR elements of the first and second reference examples.

TABLE 1

|  |  | 1st reference | 2nd reference |
|---|---|---|---|
| Protection layer | Ta | 3.0 | 3.0 |
|  | Cu | 5.0 | 5.0 |
| Free layer | NiFe | 3.0 | 3.0 |
|  | CoFe | 1.0 | 1.0 |
| Nonmagnetic conductive layer | Cu | 3.0 | 3.0 |
| Second pinned layer | CoFe |  | 1.5 |
|  | Cu |  | 0.2 |
|  | CoFe |  | 1.5 |
|  | Cu |  | 0.2 |
|  | CoFe | 4.5 | 1.5 |
| Coupling layer | Ru | 0.8 | 0.8 |
| First pinned layer | CoFe | 4.0 | 4.0 |
| Antiferromagnetic layer | IrMn | 7.0 | 7.0 |
| Underlying layer | NiFeCr | 5.0 | 5.0 |
|  | Ta | 1.0 | 1.0 |
| MR ratio (%) |  | 0.9 | 1.4 |

The MR element of the first reference example basically has a configuration similar to that of the CIP-GMR element. In the CPP-GMR element, however, contribution of bulk scattering to the magnetoresistive change is great. Therefore, the thickness of the magnetic layers of the MR element of the first reference example is made greater than that of a typical CIP-GMR element. When the thickness of each of the magnetic layers is made greater than the values listed in the above table, a slight improvement in MR ratio is expected. However, if the thickness of the free layer is made too great, the direction of magnetization in the free layer is hard to change. In addition, it is not effective that the thickness of each of the magnetic layers is made greater than the length that maintains the spin (the spin diffusion length). Considering these facts, the thicknesses of the layers of the first reference example are determined as shown in the table above.

The composition of CoFe making up each of the CoFe layers of the first and second pinned layers is 50 atomic % Co and 50 atomic % Fe. The composition of CoFe making up the CoFe layer of the free layer is 90 atomic % Co and 10 atomic % Fe. The composition of NiFe making up the NiFe layer of the free layer is 82 atomic % Ni and 18 atomic % Fe.

In the MR element of the first reference example, the second pinned layer is made up of a CoFe layer only. The MR ratio of the MR element of the first reference example is less than 1%. In the MR element of the second reference example, in contrast, the second pinned layer has a configuration in which a 1.5-nm-thick CoFe layer, a 0.2-nm-thick Cu layer, a 1.5-nm-thick CoFe layer, a 0.2-nm-thick Cu layer, and a 1.5-nm-thick CoFe layer are stacked. Four interfaces between the CoFe and Cu layers are thereby formed in the MR element of the second reference example. As a result, the MR ratio of the MR element of the second reference example is greater than that of the MR element of the first reference example.

The table below shows the configurations and the MR ratios of the MR elements of the first to fifth examples of the embodiment and the third reference example. In the table, except the first and last rows, the first column indicates the layers making up the MR elements and the second column indicates specific configurations of the layers. The positional relationship among the layers in the second column corresponds to the positional relationship among those in the MR elements. In the table, except the first and last rows, the third to eighth columns indicate the thicknesses of the layers listed in the second column of the first to fifth examples of the embodiments and the third reference example, respectively. The thicknesses are given in nanometers (nm). In the table, the last row indicates the MR ratios of the MR elements of the first to fifth examples of the embodiment and the third reference example.

the CoMn films as the magnetic films 53 and 63 is 0.5 nm. In the fifth example of the embodiment, the thickness of each of the Cu films as the nonmagnetic films 51, 52, 61 and 62 is 0.1 nm, and the thickness of each of the CoMn films as the magnetic films 53 and 63 is 0.2 nm. In the third reference example, the thickness of each of the Cu films as the nonmagnetic films 51, 52, 61 and 62 and the CoMn films as the magnetic films 53 and 63 is 1.0 nm.

In the first to fifth examples of the embodiment and the third reference example, the composition of CoFe making up the CoFe layers of the first and second pinned layers, the composition of CoFe making up the CoFe layer of the free layer, the composition of NiFe making up the NiFe layer of the free layer are the same as those of the first and second reference examples. In the second to fifth examples of the embodiment and the third reference example, the composi-

TABLE 2

|  |  | 1st ex. | 2nd ex. | 3rd ex. | 4th ex. | 5th ex. | 3rd ref. |
|---|---|---|---|---|---|---|---|
| Protection layer | Ta | 3.0 | 3.0 | 3.0 | 3.0 | 3.0 | 3.0 |
|  | Cu | 5.0 | 5.0 | 5.0 | 5.0 | 5.0 | 5.0 |
| Free layer | NiFe | 3.0 | 3.0 | 3.0 | 3.0 | 3.0 | 3.0 |
|  | CoFe | 1.0 | 1.0 | 1.0 | 1.0 | 1.0 | 1.0 |
| Non-magnetic conductive layer | Cu | 3.0 | 3.0 | 3.0 | 3.0 | 3.0 | 3.0 |
| Second pinned layer | CoFe | 1.5 | 1.5 | 1.5 | 1.5 | 1.5 | 1.5 |
|  | Cu | 0.1 | 0.2 | 0.3 | 0.5 | 0.1 | 1.0 |
|  | CoMn | 0.1 | 0.2 | 0.3 | 0.5 | 0.2 | 1.0 |
|  | Cu | 0.1 | 0.2 | 0.3 | 0.5 | 0.1 | 1.0 |
|  | CoFe | 1.5 | 1.5 | 1.5 | 1.5 | 1.5 | 1.5 |
|  | Cu | 0.1 | 0.2 | 0.3 | 0.5 | 0.1 | 1.0 |
|  | CoMn | 0.1 | 0.2 | 0.3 | 0.5 | 0.2 | 1.0 |
|  | Cu | 0.1 | 0.2 | 0.3 | 0.5 | 0.1 | 1.0 |
|  | CoFe | 1.5 | 1.5 | 1.5 | 1.5 | 1.5 | 1.5 |
| Coupling layer | Ru | 0.8 | 0.8 | 0.8 | 0.8 | 0.8 | 0.8 |
| First pinned layer | CoFe | 4.0 | 4.0 | 4.0 | 4.0 | 4.0 | 4.0 |
| Anti-ferromagnetic layer | IrMn | 7.0 | 7.0 | 7.0 | 7.0 | 7.0 | 7.0 |
| Underlying layer | NiFeCr | 5.0 | 5.0 | 5.0 | 5.0 | 5.0 | 5.0 |
|  | Ta | 1.0 | 1.0 | 1.0 | 1.0 | 1.0 | 1.0 |
| MR ratio (%) |  | 2.0 | 2.1 | 2.1 | 2.0 | 2.1 | 1.3 |

In the MR element 5 of the first example of the embodiment, the second pinned layer 32 has a configuration in which the following layers are stacked: a 1.5-nm-thick CoFe layer as the magnetic layer 41, a 0.1-nm-thick Cu film as the nonmagnetic film 51, a 0.1-nm-thick CoMn film as the magnetic film 53, a 0.1-nm-thick Cu film as the nonmagnetic film 52, a 1.5-nm-thick CoFe layer as the magnetic layer 42, a 0.1-nm-thick Cu film as the nonmagnetic film 61, a 0.1-nm-thick CoMn film as the magnetic film 63, a 0.1-nm-thick Cu film as the nonmagnetic film 62, and a 1.5-nm-thick CoFe layer as the magnetic layer 43.

In each of the MR elements 5 of the second to fifth examples of the embodiment and the third reference example, the thicknesses of the Cu films as the nonmagnetic films 51, 52, 61 and 62 and the thicknesses of the CoMn films as the magnetic films 53 and 63 are different from those of the first example of the embodiment, while the remainder of configuration is the same as that of the first example. In the second example of the embodiment, the thickness of each of the Cu films as the nonmagnetic films 51, 52, 61 and 62 and the CoMn films as the magnetic films 53 and 63 is 0.2 nm. In the third example of the embodiment, the thickness of each of the Cu films as the nonmagnetic films 51, 52, 61 and 62 and the CoMn films as the magnetic films 53 and 63 is 0.3 nm. In the fourth example of the embodiment, the thickness of each of the Cu films as the nonmagnetic films 51, 52, 61 and 62 and tion of CoMn making up the CoMn films as the magnetic films 53 and 63 is 95 atomic % Co and 5 atomic % Mn.

In any of the first to fifth examples of the embodiment, the MR ratio is 2% or greater which is much greater than those of the first and second reference examples. The reason would be that a noticeable effect results from the fact that there exist a great number of interfaces between the CoMn film and the Cu film each having a great interface scattering coefficient γ. In any of the first to fifth examples of the embodiment, the thickness of each of the Cu films and the CoMn films is very small. As a result, the magnetic property of the second pinned layer is not very different from that of the case in which the Cu films and the CoMn films are not inserted to the second pinned layer.

In the third reference example, the MR ratio is as small as 1.3%, which also indicates that it is not preferred that the CoMn films as the magnetic films 53 and 63 are too thick.

The table below shows the configuration and the MR ratio of the MR element of the sixth example of the embodiment. In the table, except the first and last rows, the first column indicates the layers making up the MR element and the second column indicates specific configurations of the layers. The positional relationship among the layers in the second column corresponds to the positional relationship among those in the MR element. In the table, except the first and last rows, the third column indicates the thickness of each of the layers listed in the second column of the sixth example of the embodiment. The thicknesses are given in nanometers (nm). In the table, the last row indicates the MR ratio of the MR element of the sixth example of the embodiment.

TABLE 3

|  |  | 6th example |
|---|---|---|
| Protection layer | Ta | 3.0 |
|  | Cu | 5.0 |
| Free layer | NiFe | 3.0 |
|  | CoFe | 1.0 |
| Nonmagnetic conductive layer | Cu | 3.0 |
| Second pinned layer | CoFe | 1.5 |
|  | Cu | 0.2 |
|  | CoFe | 0.2 |
|  | Cu | 0.2 |
|  | CoFe | 1.5 |
|  | Cu | 0.2 |
|  | CoFe | 0.2 |
|  | Cu | 0.2 |
|  | CoFe | 1.5 |
| Coupling layer | Ru | 0.8 |
| First pinned layer | CoFe | 4.0 |
| Antiferromagnetic layer | IrMn | 7.0 |
| Underlying layer | NiFeCr | 5.0 |
|  | Ta | 1.0 |
| MR ratio (%) |  | 1.9 |

The configuration of the MR element 5 of the sixth example of the embodiment is the same as that of the second example of the embodiment except that each of the magnetic films 53 and 63 is a 0.2-nm-thick CoFe film. In the sixth example, the composition of CoFe making up the CoFe film as each of the magnetic films 53 and 63 is 50 atomic % Co and 50 atomic % Fe.

In the sixth example of the embodiment, an MR ratio greater than those of the first and second reference examples is obtained. Therefore, it is noted that the MR ratio of the MR element 5 is increased even if the magnetic films 53 and 63 are made of CoFe.

The table below shows the result of obtaining the MR ratios of eight MR elements 5 wherein the materials of the magnetic films 53 and 63 have different compositions. The eight MR elements 5 are the same as those of the second and sixth examples of the embodiment except the materials of the magnetic films 53 and 63. The table below shows that, if the magnetic films 53 and 63 are made of CoFe or CoMn, a great MR ratio is obtained in a wide range of compositions of such a material. Furthermore, the table shows that, if the magnetic films 53 and 63 are made of NiFe, a greater MR ratio is obtained, too, compared with the first and second reference examples.

TABLE 4

| Magnetic film | MR ratio (%) |
|---|---|
| CoFe (90 atomic %: 10 atomic %) | 1.8 |
| CoFe (70 atomic %: 30 atomic %) | 1.9 |
| CoFe (50 atomic %: 50 atomic %) | 1.9 |
| CoFe (30 atomic %: 70 atomic %) | 2.0 |
| CoMn (99 atomic %: 1 atomic %) | 1.7 |
| CoMn (95 atomic %: 5 atomic %) | 2.1 |
| CoMn (80 atomic %: 20 atomic %) | 2.0 |
| NiFe (81 atomic %: 19 atomic %) | 1.7 |

Next, the results of measurement of reading outputs by feeding a sense current of 5 mA are shown for the MR elements of the first and second reference examples, and the second and sixth examples of the embodiment. Here, the reading outputs of the MR elements are indicated as normalized reading outputs obtained by normalizing such that the reading output of the MR element of the first reference example is 1.0.

TABLE 5

|  | Normalized reading output |
|---|---|
| 1st reference example | 1.0 |
| 2nd reference example | 1.5 |
| 2nd example | 2.5 |
| 6th example | 2.1 |

According to the embodiment, as the table above shows, the reading output of the MR element 5 is increased.

Figure 5:
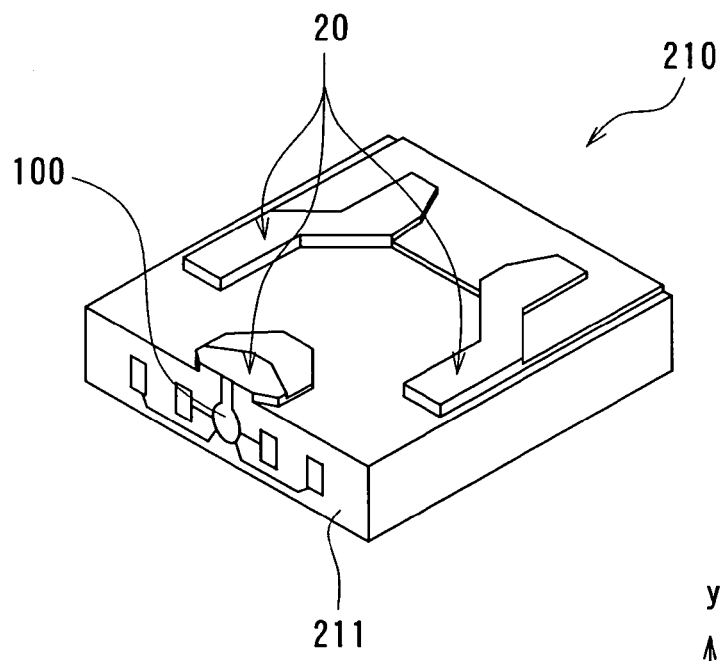
FIG. 5 is a perspective view that illustrates a slider incorporated in a head gimbal assembly of the first embodiment of the invention.

A head gimbal assembly and a magnetic disk drive of the embodiment will now be described. Reference is made to FIG. 5 to describe a slider 210 incorporated in the head gimbal assembly. In the magnetic disk drive, the slider 210 is placed to face toward a magnetic disk platter that is a circular-plate-shaped recording medium to be rotated and driven. The slider 210 has a base body 211 made up mainly of the substrate 1 and the overcoat layer 17 of FIG. 3. The base body 211 is nearly hexahedron-shaped. One of the six surfaces of the base body 211 faces toward the magnetic disk platter. The air bearing surface 20 is formed in this one of the surfaces. When the magnetic disk platter rotates in the z direction of FIG. 5, an airflow passes between the magnetic disk platter and the slider 210 and a lift is thereby generated below the slider 210 in the y direction of FIG. 5 and exerted on the slider 210. The slider 210 flies over the magnetic disk platter by means of the lift. The x direction of FIG. 5 is across the tracks of the magnetic disk platter. A thin-film magnetic head 100 of the embodiment is formed near the air-outflow-side end (the end located at the lower left of FIG. 5) of the slider 210.

Figure 6:
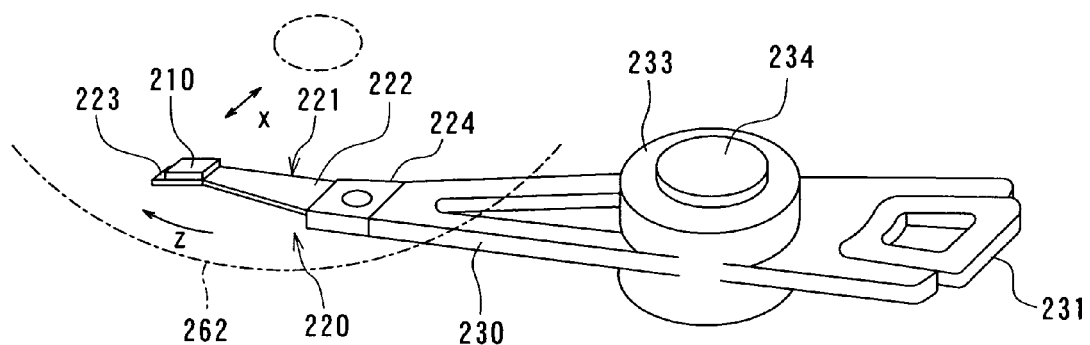
FIG. 6 is a perspective view that illustrates a head arm assembly including the head gimbal assembly of the first embodiment of the invention.

Reference is now made to FIG. 6 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembled body comprising the arm 230 and the head gimbal assembly 220 attached to the arm 230 is called a head arm assembly. An assembled body comprising a carriage having a plurality of arms wherein the head gimbal assembly 220 is attached to each of the arms is called a head stack assembly.

FIG. 6 illustrates an example of the head arm assembly. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 7:
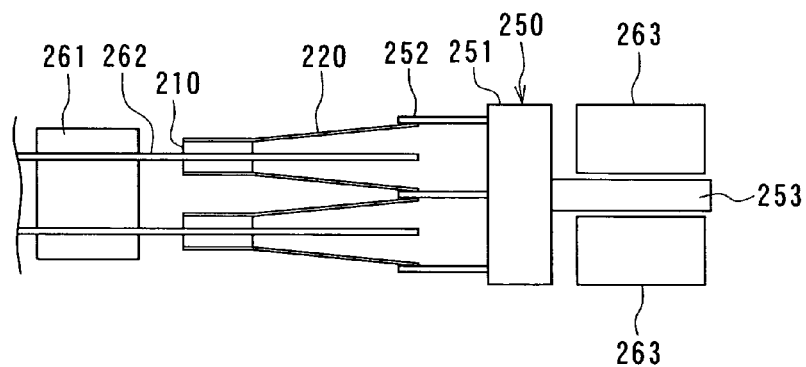
FIG. 7 is a view for illustrating the main part of a magnetic disk drive of the first embodiment of the invention.
Figure 8:
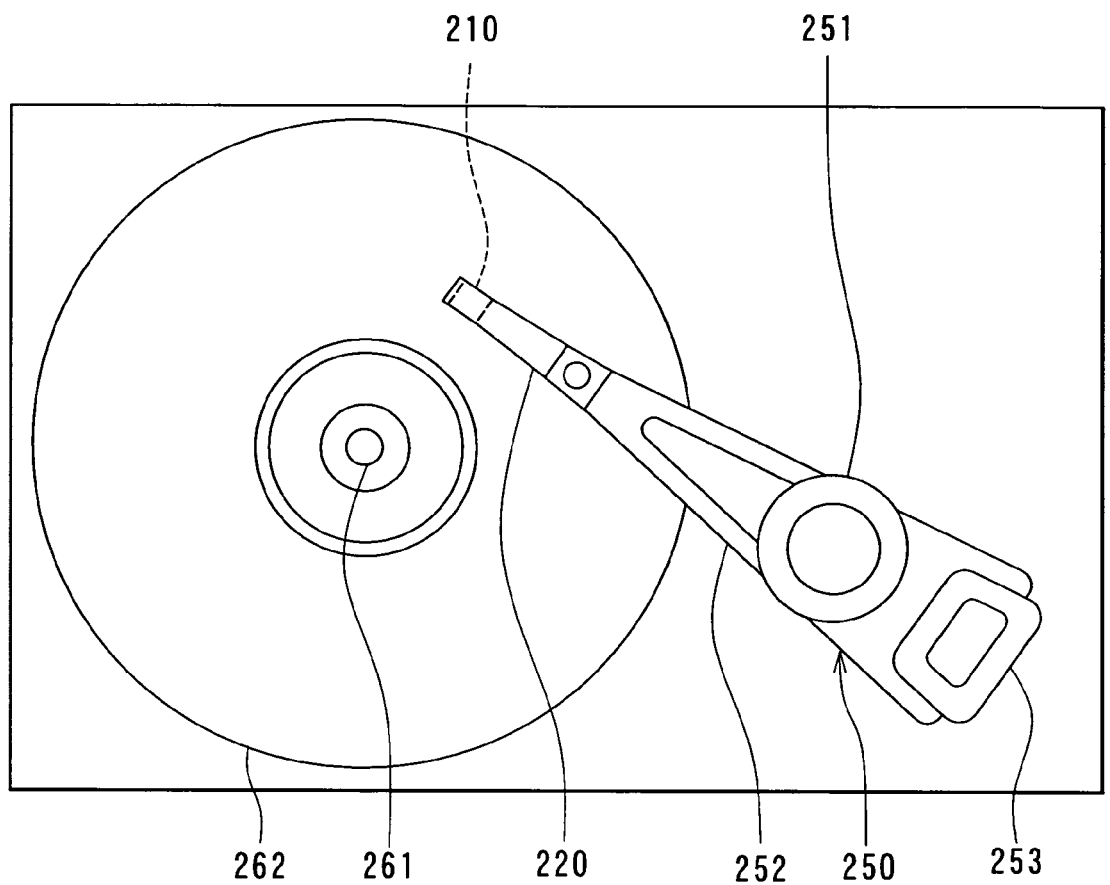
FIG. 8 is a top view of the magnetic disk drive of the first embodiment of the invention.

Reference is now made to FIG. 7 and FIG. 8 to describe an example of the head stack assembly and the magnetic disk drive of the embodiment. FIG. 7 illustrates the main part of the magnetic disk drive. FIG. 8 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The thin-film magnetic head incorporated in the slider 210 writes data on the magnetic disk platter 262 through the use of the write head and reads data stored on the magnetic disk platter 262 through the use of the read head.

The head gimbal assembly and the magnetic disk drive of the embodiment exhibit effects similar to those of the foregoing thin-film magnetic head of the embodiment.

Second Embodiment

Figure 9:
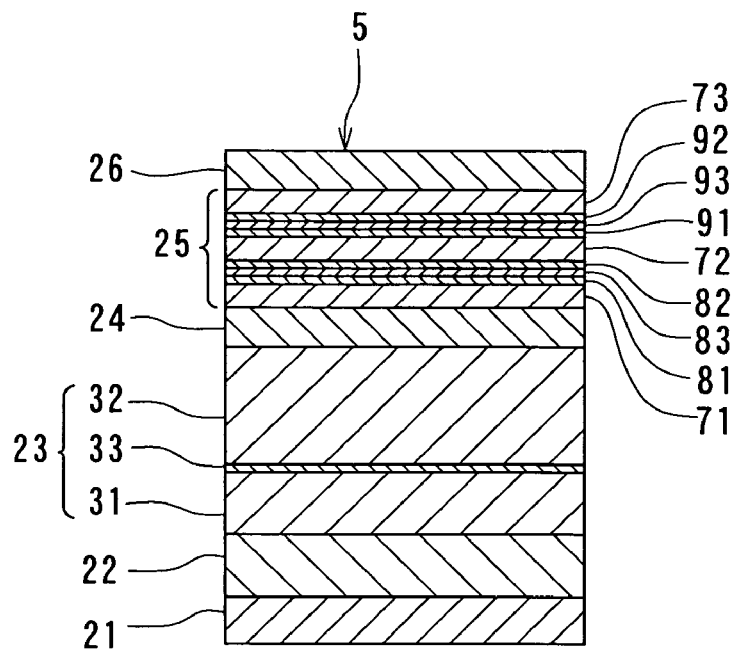
FIG. 9 is a cross-sectional view illustrating the configuration of layers of an MR element of a second embodiment of the invention.

Reference is now made to FIG. 9 to describe the configuration of an MR element of a second embodiment of the invention. FIG. 9 is a cross-sectional view illustrating the configuration of layers of the MR element 5 of the second embodiment. The configuration of each of the second pinned layer 32 and the free layer 25 of the second embodiment is different from that of the first embodiment.

The second pinned layer 32 of the second embodiment does not include the layered structure made up of the nonmagnetic film 51, the magnetic film 53 and the nonmagnetic film 52 and the layered structure made up of the nonmagnetic film 61, the magnetic film 63 and the nonmagnetic film 62. However, the second pinned layer 32 of the second embodiment may include a plurality of magnetic layers and nonmagnetic layers each of which is disposed between adjacent ones of the magnetic layers.

The free layer 25 of the second embodiment incorporates three magnetic layers 71, 72 and 73 each of which is made of a magnetic material. The magnetic layer 71 is disposed adjacent to the nonmagnetic conductive layer 24. The magnetic layer 73 is disposed adjacent to the protection layer 26. The magnetic layer 72 is disposed between the magnetic layers 71 and 73. Each of the magnetic layers 71, 72 and 73 preferably has a thickness that falls within a range of 1 to 2 nm inclusive.

The free layer 25 further incorporates: a nonmagnetic film 81 disposed between the magnetic layers 71 and 72 and adjacent to the magnetic layer 71; a nonmagnetic film 82 disposed between the magnetic layers 71 and 72 and adjacent to the magnetic layer 72; and a magnetic film 83 disposed between the nonmagnetic films 81 and 82 and touching the films 81 and 82. The nonmagnetic films 81 and 82 correspond to the first and second nonmagnetic films of the invention. As for the nonmagnetic films 81 and 82 and the magnetic film 83, the magnetic layer 71 corresponds to the first magnetic layer of the invention, and the magnetic layer 72 corresponds to the second magnetic layer of the invention.

The free layer 25 further incorporates: a nonmagnetic film 91 disposed between the magnetic layers 72 and 73 and adjacent to the magnetic layer 72; a nonmagnetic film 92 disposed between the magnetic layers 72 and 73 and adjacent to the magnetic layer 73; and a magnetic film 93 disposed between the nonmagnetic films 91 and 92 and touching the films 91 and 92. The nonmagnetic films 91 and 92 correspond to the first and second nonmagnetic films of the invention. As for the nonmagnetic films 91 and 92 and the magnetic film 93, the magnetic layer 72 corresponds to the first magnetic layer of the invention, and the magnetic layer 73 corresponds to the second magnetic layer of the invention.

Each of the nonmagnetic films 81, 82, 91 and 92 is made of copper (Cu), and preferably has a thickness greater than 0 and smaller than or equal to 0.5 nm. The nonmagnetic films 81, 82, 91 and 92 may be formed by sputtering, for example. The average thickness of the nonmagnetic films 81, 82, 91 and 92 is preferably 0.05 nm or greater, and more preferably 0.2 nm or greater. The thickness of 0.05 nm is nearly equal to the minimum thickness of each of the nonmagnetic films 81, 82, 91 and 92 that can be formed.

Each of the magnetic films 83 and 93 is made of a magnetic material containing any of cobalt (Co), nickel (Ni) and iron (Fe), and has a thickness greater than 0 and smaller than or equal to 0.5 nm. The magnetic films 83 and 93 may be formed by sputtering, for example. The average thickness of the magnetic films 83 and 93 is preferably 0.05 nm or greater, and more preferably 0.2 nm or greater. The thickness of 0.05 nm is nearly equal to the minimum thickness of each of the magnetic films 83 and 93 that can be formed.

In the second embodiment, interfaces having a relatively great interface scattering coefficient γ are formed between the magnetic layer 71 and the nonmagnetic film 81, between the nonmagnetic film 81 and the magnetic film 83, between the magnetic film 83 and the nonmagnetic film 82, between the nonmagnetic film 82 and the magnetic layer 72, between the magnetic layer 72 and the nonmagnetic film 91, between the nonmagnetic film 91 and the magnetic film 93, between the magnetic film 93 and the nonmagnetic film 92, and between the nonmagnetic film 92 and the magnetic layer 73. As a result, according to the embodiment, a great magnetoresistive change is obtained when a current is fed in the direction perpendicular to the planes of the layers making up the MR element 5.

According to the embodiment, each of the magnetic films 83 and 93 has a thickness greater than 0 and smaller than or equal to 0.5 nm. As a result, it is possible that each of the magnetic layers 71, 72 and 73 has a thickness sufficient for obtaining a desired magnetic property, such as a thickness that falls within a range of 1 to 2 nm inclusive, without much increasing the entire thickness of the free layer 25.

A specific example of the second embodiment will be described, together with examples of other embodiments. The remainder of configuration, operation and effects of the second embodiment are similar to those of the first embodiment.

Third Embodiment

Figure 10:
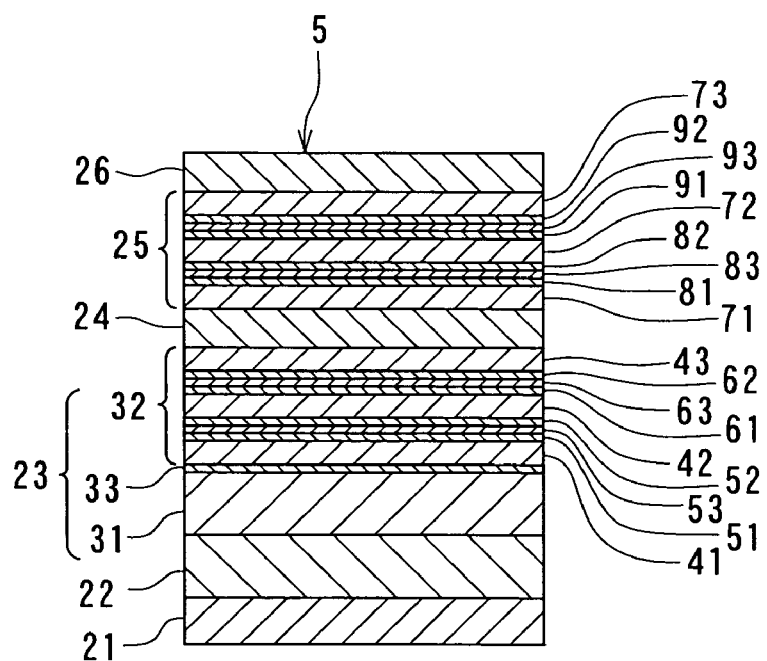
FIG. 10 is a cross-sectional view illustrating the configuration of layers of an MR element of a third embodiment of the invention.

Reference is now made to FIG. 10 to describe the configuration of an MR element of a third embodiment of the invention. FIG. 10 is a cross-sectional view illustrating the configuration of layers of the MR element 5 of the third embodiment. The configuration of the free layer 25 of the third embodiment is different from that of the first embodiment, but the same as that of the second embodiment. Therefore, in the third embodiment, the second pinned layer 32 and the free layer 25 both include the layered structures each made up of a nonmagnetic film, a magnetic film and a nonmagnetic film.

In the third embodiment, each of the second pinned layer 32 and the free layer 25 includes a number of interfaces each having a relatively great interface scattering coefficient γ. As a result, according to the embodiment, a great magnetoresistive change is obtained when a current is fed in the direction perpendicular to the planes of the layers making up the MR element 5.

The remainder of configuration, operation and effects of the third embodiment are similar to those of the first embodiment.

The table below shows the configurations and the MR ratios of MR elements of seventh to ninth examples of the embodiments. The seventh example is an example of the first embodiment. The eighth example is an example of the second embodiment. The ninth example is an example of the third embodiment. In the table below, except the first and last rows, the first column indicates the layers making up the MR elements. In the table, except the first and last rows, the second and third columns indicate specific configurations and thicknesses of the layers of the MR element of the seventh example. The fourth and fifth columns indicate specific configurations and thicknesses of the layers of the MR element of the eighth example. The sixth and seventh columns indicate specific configurations and thicknesses of the layers of the MR element of the ninth example. The positional relationship among the layers in each of the second, fourth and sixth columns corresponds to the positional relationship among those in the MR elements. The thicknesses are given in nanometers (nm). In the table below, the last row indicates the MR ratios of the MR elements of the seventh to ninth examples.

TABLE 6

|  | 7th example | | 8th example | | 9th example | |
| --- | --- | --- | --- | --- | --- | --- |
| Protection layer | Ta | 3.0 | Ta | 3.0 | Ta | 3.0 |
|  | Cu | 5.0 | Cu | 5.0 | Cu | 5.0 |
| Free layer | CoFe | 3.0 | CoFe | 1.0 | CoFe | 1.0 |
|  |  |  | Cu | 0.2 | Cu | 0.2 |
|  |  |  | CoMn | 0.2 | CoMn | 0.2 |
|  |  |  | Cu | 0.2 | Cu | 0.2 |
|  |  |  | CoFe | 1.0 | CoFe | 1.0 |
|  |  |  | Cu | 0.2 | Cu | 0.2 |
|  |  |  | CoMn | 0.2 | CoMn | 0.2 |
|  |  |  | Cu | 0.2 | Cu | 0.2 |
|  |  |  | CoFe | 1.0 | CoFe | 1.0 |
| Nonmagnetic conductive layer | Cu | 3.0 | Cu | 3.0 | Cu | 3.0 |
| Second pinned layer | CoFe | 1.5 | CoFe | 1.5 | CoFe | 1.5 |
|  | Cu | 0.2 | Cu | 0.2 | Cu | 0.2 |
|  | CoMn | 0.2 |  |  | CoMn | 0.2 |
|  | Cu | 0.2 |  |  | Cu | 0.2 |
|  | CoFe | 1.5 | CoFe | 1.5 | CoFe | 1.5 |
|  | Cu | 0.2 | Cu | 0.2 | Cu | 0.2 |
|  | CoMn | 0.2 |  |  | CoMn | 0.2 |
|  | Cu | 0.2 |  |  | Cu | 0.2 |
|  | CoFe | 1.5 | CoFe | 1.5 | CoFe | 1.5 |
| Coupling layer | Ru | 0.8 | Ru | 0.8 | Ru | 0.8 |
| First pinned layer | CoFe | 4.0 | CoFe | 4.0 | CoFe | 4.0 |

TABLE 6-continued

|  | 7th example | | 8th example | | 9th example | |
| --- | --- | --- | --- | --- | --- | --- |
| Antiferromagnetic layer | IrMn | 7.0 | IrMn | 7.0 | IrMn | 7.0 |
| Underlying layer | NiFeCr | 5.0 | NiFeCr | 5.0 | NiFeCr | 5.0 |
|  | Ta | 1.0 | Ta | 1.0 | Ta | 1.0 |
| MR ratio (%) |  | 2.1 |  | 2.2 |  | 2.7 |

The configuration of the MR element 5 of the seventh example is the same as that of the second example except that the free layer 25 is made up only of a 3.0-nm-thick CoFe layer.

In the MR element 5 of the eighth example, the second pinned layer 32 has a configuration in which the following layers are stacked: a 1.5-nm-thick CoFe layer, a 0.2 nm-thick Cu layer, a 1.5-nm-thick CoFe layer, a 0.2-nm-thick Cu layer, and a 1.5-nm-thick CoFe layer. In the MR element 5 of the eighth example, the free layer 25 has a configuration in which the following layers are stacked: a 1.0-nm-thick CoFe layer as the magnetic layer 71, a 0.2-nm-thick Cu film as the nonmagnetic film 81, a 0.2-nm-thick CoMn film as the magnetic film 83, a 0.2-nm-thick Cu film as the nonmagnetic film 82, a 1.0-nm-thick CoFe layer as the magnetic layer 72, a 0.2-nm-thick Cu film as the nonmagnetic film 91, a 0.2-nm-thick CoMn film as the magnetic film 93, a 0.2-nm-thick Cu film as the nonmagnetic film 92, and a 1.0-nm-thick CoFe layer as the magnetic layer 73. The remainder of configuration of the MR element 5 of the eighth example is the same as that of the seventh example.

The configuration of the MR element 5 of the ninth example is the same as that of the seventh example except that the free layer 25 has a configuration the same as that of the eighth example. In each of the seventh to ninth examples the composition of CoFe making up each of the CoFe layers of the free layer 25 is 90 atomic % Co and 10 atomic % Fe. In each of the eighth and ninth examples, each of the magnetic layers 71, 72 and 73 could be made of an NiFe layer. In this case, however, the Cu layer and the NiFe layer would form a solid solution and induce a reduction in magnetic property of the free layer 25. Therefore, each of the magnetic layers 71, 72 and 73 is made of a CoFe layer in each of the eighth and ninth examples. In each of the eighth and ninth examples, the composition of CoMn making up the CoMn film as each of the magnetic films 83 and 93 is 95 atomic % Co and 5 atomic % Mn.

The MR ratios of the seventh to ninth examples are much greater than those of the first and second reference examples. The MR ratio of the ninth example is the greatest among the seventh to ninth examples. The reason would be that the MR element 5 of the ninth example includes the greatest number of interfaces having a relatively great interface scattering coefficient γ among the seventh to ninth examples since the second pinned layer 32 and the free layer 25 both include the layered structures each made up of the Cu films, the CoMn films and the Cu films in the MR element 5 of the ninth example.

In each of the eighth and ninth examples, the free layer 25 includes the layered structure made up of the Cu films, the CoMn films and the Cu films. Since the free layer 25 is a layer in which the direction of magnetization changes in response to a signal magnetic field, an excellent soft magnetic property is required. In each of the eighth and ninth examples, the CoFe that makes up the CoFe layers of the free layer 25 has a composition of 90 atomic % Co and 10 atomic % Fe, which has a relatively good soft magnetic property. In addition, each of the Cu films and the CoMn films has a very small thickness. As a result, no reduction in soft magnetic property of the free layer 25 is observed, compared with the case in which Cu films and CoMn films are not inserted to the free layer 25.

The table below shows the configurations and the MR ratios of MR elements of tenth to twelfth examples. The tenth example is an example of the first embodiment. The eleventh example is an example of the second embodiment. The twelfth example is an example of the third embodiment. In the table below, except the first and last rows, the first column indicates the layers making up the MR elements. In the table below, except the first and last rows, the second and third columns indicate specific configurations and thicknesses of the layers of the MR element of the tenth example. The fourth and fifth columns indicate specific configurations and thicknesses of the layers of the MR element of the eleventh example. The sixth and seventh columns indicate specific configurations and thicknesses of the layers of the MR element of the twelfth example. The positional relationship among the layers in each of the second, fourth and sixth columns corresponds to the positional relationship among those in the MR elements. The thicknesses are given in nanometers (nm). In the table below, the last row indicates the MR ratios of the MR elements of the tenth to twelfth examples.

TABLE 7

|  | 10th example | | 11th example | | 12th example | |
| --- | --- | --- | --- | --- | --- | --- |
| Protection layer | Ta | 3.0 | Ta | 3.0 | Ta | 3.0 |
| | Cu | 5.0 | Cu | 5.0 | Cu | 5.0 |
| Free layer | CoFe | 3.0 | CoFe | 1.0 | CoFe | 1.0 |
| | | | Cu | 0.2 | Cu | 0.2 |
| | | | CoFe | 0.2 | CoFe | 0.2 |
| | | | Cu | 0.2 | Cu | 0.2 |
| | | | CoFe | 1.0 | CoFe | 1.0 |
| | | | Cu | 0.2 | Cu | 0.2 |
| | | | CoFe | 0.2 | CoFe | 0.2 |
| | | | Cu | 0.2 | Cu | 0.2 |
| | | | CoFe | 1.0 | CoFe | 1.0 |
| Nonmagnetic conductive layer | Cu | 3.0 | Cu | 3.0 | Cu | 3.0 |
| Second pinned layer | CoFe | 1.5 | CoFe | 1.5 | CoFe | 1.5 |
| | Cu | 0.2 | Cu | 0.2 | Cu | 0.2 |
| | CoFe | 0.2 | | | CoFe | 0.2 |
| | Cu | 0.2 | | | Cu | 0.2 |
| | CoFe | 1.5 | CoFe | 1.5 | CoFe | 1.5 |
| | Cu | 0.2 | Cu | 0.2 | Cu | 0.2 |
| | CoFe | 0.2 | | | CoFe | 0.2 |
| | Cu | 0.2 | | | Cu | 0.2 |
| | CoFe | 1.5 | CoFe | 1.5 | CoFe | 1.5 |
| Coupling layer | Ru | 0.8 | Ru | 0.8 | Ru | 0.8 |
| First pinned layer | CoFe | 4.0 | CoFe | 4.0 | CoFe | 4.0 |
| Antiferromagnetic layer | IrMn | 7.0 | IrMn | 7.0 | IrMn | 7.0 |
| Underlying layer | NiFeCr | 5.0 | NiFeCr | 5.0 | NiFeCr | 5.0 |
| | Ta | 1.0 | Ta | 1.0 | Ta | 1.0 |
| MR ratio (%) | 1.9 | | 2.0 | | 2.4 | |

The configuration of the MR element 5 of the tenth example is the same as that of the sixth example except that the free layer 25 is made up only of a 3.0-nm-thick CoFe layer.

In the MR element 5 of the eleventh example, the second pinned layer 32 has a configuration in which the following layers are stacked: a 1.5-nm-thick CoFe layer, a 0.2-nm-thick Cu layer, a 1.5-nm-thick CoFe layer, a 0.2-nm-thick Cu layer, and a 1.5-nm-thick CoFe layer. In the MR element 5 of the eleventh example, the free layer 25 has a configuration in which the following layers are stacked: a 1.0-nm-thick CoFe layer as the magnetic layer 71, a 0.2 nm-thick Cu film as the nonmagnetic film 81, a 0.2-nm-thick CoFe film as the magnetic film 83, a 0.2-nm-thick Cu film as the nonmagnetic film 82, a 1.0-nm-thick CoFe layer as the magnetic layer 72, a 0.2-nm-thick Cu film as the nonmagnetic film 91, a 0.2-nm-thick CoFe film as the magnetic film 93, a 0.2-nm-thick Cu film as the nonmagnetic film 92, and a 1.0-nm-thick CoFe layer as the magnetic layer 73. The remainder of configuration of the MR element 5 of the eleventh example is the same as that of the tenth example.

The configuration of the MR element 5 of the twelfth example is the same as that of the tenth example except that the free layer 25 has a configuration the same as that of the eleventh example. In each of the tenth to twelfth examples the composition of CoFe making each of the CoFe layers of the free layer 25 is 90 atomic % Co and 10 atomic % Fe.

The MR ratios of the tenth to twelfth examples are much greater than those of the first and second reference examples. The MR ratio of the twelfth example is the greatest among the tenth to twelfth examples. The reason would be that the MR element 5 of the twelfth example includes the greatest number of interfaces having a relatively great interface scattering coefficient γ among the tenth to twelfth examples since the second pinned layer 32 and the free layer 25 both include the layered structures each made up of the Cu films, the CoFe films and the Cu films in the MR element 5 of the twelfth example.

In each of the eleventh and twelfth examples the free layer 25 includes the layered structure made up of the Cu films, the CoFe films and the Cu films. Because of the same reason as the eighth and ninth examples, no reduction in soft magnetic property of the free layer 25 is observed, compared with the case in which Cu films and CoFe films are not inserted to the free layer 25.

The present invention is not limited to the foregoing embodiments but may be practiced in still other ways. For example, in the foregoing embodiments, at least one of the second pinned layer 32 and the free layer 25 includes the two layered structures each made up of the nonmagnetic film, the magnetic film and the nonmagnetic film. According to the invention, however, at least one of the second pinned layer 32 and the free layer 25 may include a single layered structure made up of a nonmagnetic film, a magnetic film and a nonmagnetic film, or three or more layered structures each made up of a nonmagnetic film, a magnetic film and a nonmagnetic film.

According to the invention, the pinned layer 23 is not limited to the synthetic pinned layer. If the pinned layer 23 is the synthetic pinned layer, it is required that the layered structure made up of the nonmagnetic film, the magnetic film and the nonmagnetic film be provided in the second pinned layer close to the nonmagnetic conductive layer.

In the second or third embodiment, the magnetic films 83 and 93 may be made of NiFe.

The materials of the magnetic films of the invention are not limited to the magnetic materials given in the foregoing embodiments but may be other sorts of magnetic materials.

In the foregoing embodiments, the thin-film magnetic head is disclosed, comprising the read head formed on the base body and the write head stacked on the read head. Alternatively, the read head may be stacked on the write head.

The thin-film magnetic head may have a configuration comprising the read head only if the thin-film magnetic head is dedicated to reading.

Obviously many modifications and variations of the present invention are possible in the light of the above teachings. It is therefore to be understood that within the scope of the appended claims the invention may be practiced otherwise than as specifically described.

What is claimed is:

1. A magnetoresistive element comprising:
a nonmagnetic conductive layer having two surfaces facing toward opposite directions;
a free layer disposed adjacent to one of the surfaces of the nonmagnetic conductive layer, wherein the direction of magnetization in the free layer changes in response to an external magnetic field; and
a pinned layer disposed adjacent to the other of the surfaces of the nonmagnetic conductive layer, wherein the direction of magnetization in the pinned layer is fixed, wherein:
the pinned layer incorporates: first, second and third magnetic layers each of which is made of a magnetic material; a first nonmagnetic film disposed between the first and second magnetic layers and adjacent to the first magnetic layer; a second nonmagnetic film disposed between the first and second magnetic layers and adjacent to the second magnetic layer; a first magnetic film disposed between the first and second nonmagnetic films and touching the first and second nonmagnetic films; a third nonmagnetic film disposed between the second and third magnetic layers and adjacent to the second magnetic layer; a fourth nonmagnetic film disposed between the second and third magnetic layers and adjacent to the third magnetic layer; and a second magnetic film disposed between the third and fourth nonmagnetic films and touching the third and fourth nonmagnetic films;
each of the first, second, third and fourth nonmagnetic films is made of copper;
each of the first and second magnetic films is made of a cobalt-manganese alloy, and has a thickness greater than zero and smaller than or equal to 0.5 nm;
each of the first, second, third and fourth nonmagnetic films has a thickness greater than zero and smaller than or equal to 0.5 nm; and
each of the first, second and third magnetic layers has a thickness that falls within a range of 1 to 2 nm, inclusive.

2. A thin-film magnetic head comprising:
a medium facing surface that faces toward a recording medium;
a magnetoresistive element disposed near the medium facing surface to detect a signal magnetic field sent from the recording medium; and
a pair of electrodes for feeding a current for detecting magnetic signals to the magnetoresistive element in a direction perpendicular to planes of layers making up the magnetoresistive element, the magnetoresistive element comprising:
a nonmagnetic conductive layer having two surfaces facing toward opposite directions;
a free layer disposed adjacent to one of the surfaces of the nonmagnetic conductive layer, wherein the direction of magnetization in the free layer changes in response to an external magnetic field; and
a pinned layer disposed adjacent to the other of the surfaces of the nonmagnetic conductive layer, wherein the direction of magnetization in the pinned layer is fixed, wherein:
the pinned layer incorporates: first, second and third magnetic layers each of which is made of a magnetic material; a first nonmagnetic film disposed between the first and second magnetic layers and adjacent to the first magnetic layer; a second nonmagnetic film disposed between the first and second magnetic layers and adjacent to the second magnetic layer; a first magnetic film disposed between the first and second nonmagnetic films and touching the first and second nonmagnetic films; a third nonmagnetic film disposed between the second and third magnetic layers and adjacent to the second magnetic layer; a fourth nonmagnetic film disposed between the second and third magnetic layers and adjacent to the third magnetic layer; and a second magnetic film disposed between the third and fourth nonmagnetic films and touching the third and fourth nonmagnetic films;
each of the first, second, third and fourth nonmagnetic films is made of copper;
each of the first and second magnetic films is made of a cobalt-manganese alloy, and has a thickness greater than zero and smaller than or equal to 0.5 nm;
each of the first, second, third and fourth nonmagnetic films has a thickness greater than zero and smaller than or equal to 0.5 nm; and
each of the first, second and third magnetic layers has a thickness that falls within a range of 1 to 2 nm, inclusive.

3. A head gimbal assembly comprising:
a slider including a thin-film magnetic head and disposed to face toward a recording medium; and
a suspension flexibly supporting the slider, the thin-film magnetic head comprising:
a medium facing surface that faces toward the recording medium;
a magnetoresistive element disposed near the medium facing surface to detect a signal magnetic field sent from the recording medium; and
a pair of electrodes for feeding a current for detecting magnetic signals to the magnetoresistive element in a direction perpendicular to planes of layers making up the magnetoresistive element, the magnetoresistive element comprising:
a nonmagnetic conductive layer having two surfaces facing toward opposite directions;
a free layer disposed adjacent to one of the surfaces of the nonmagnetic conductive layer, wherein the direction of magnetization in the free layer changes in response to an external magnetic field; and
a pinned layer disposed adjacent to the other of the surfaces of the nonmagnetic conductive layer, wherein the direction of magnetization in the pinned layer is fixed, wherein:
the pinned layer incorporates: first, second and third magnetic layers each of which is made of a magnetic material; a first nonmagnetic film disposed between the first and second magnetic layers and adjacent to the first magnetic layer; a second nonmagnetic film disposed between the first and second magnetic layers and adjacent to the second magnetic layer; a first magnetic film disposed between the first and second nonmagnetic films and touching the first and second nonmagnetic films; a third nonmagnetic film disposed between the second and third magnetic layers and adjacent to the second magnetic layer; a fourth nonmagnetic film disposed between the second and third magnetic layers and adjacent to the third magnetic layer; and a second magnetic film disposed between the third and fourth nonmagnetic films and touching the third and fourth nonmagnetic films;

each of the first, second, third and fourth nonmagnetic films is made of copper;

each of the first and second magnetic films is made of a cobalt-manganese alloy, and has a thickness greater than zero and smaller than or equal to 0.5 nm;

each of the first, second, third and fourth nonmagnetic films has a thickness greater than zero and smaller than or equal to 0.5 nm; and each of the first, second and third magnetic layers has a thickness that falls within a range of 1 to 2 nm, inclusive.

4. A magnetic disk drive comprising:

a slider including a thin-film magnetic head and disposed to face toward a circular-plate-shaped recording medium that is rotated and driven; and an alignment device supporting the slider and aligning the slider with respect to the recording medium, the thin-film magnetic head comprising:

a medium facing surface that faces toward the recording medium;

a magnetoresistive element disposed near the medium facing surface to detect a signal magnetic field sent from the recording medium; and a pair of electrodes for feeding a current for detecting magnetic signals to the magnetoresistive element in a direction perpendicular to planes of layers making up the magnetoresistive element, the magnetoresistive element comprising:

a nonmagnetic conductive layer having two surfaces facing toward opposite directions;

a free layer disposed adjacent to one of the surfaces of the nonmagnetic conductive layer, wherein the direction of magnetization in the free layer changes in response to an external magnetic field; and a pinned layer disposed adjacent to the other of the surfaces of the nonmagnetic conductive layer, wherein the direction of magnetization in the pinned layer is fixed, wherein:

the pinned layer incorporates: first, second and third magnetic layers each of which is made of a magnetic material; a first nonmagnetic film disposed between the first and second magnetic layers and adjacent to the first magnetic layer; a second nonmagnetic film disposed between the first and second magnetic layers and adjacent to the second magnetic layer; a first magnetic film disposed between the first and second nonmagnetic films and touching the first and second nonmagnetic films; a third nonmagnetic film disposed between the second and third magnetic layers and adjacent to the second magnetic layer; a fourth nonmagnetic film disposed between the second and third magnetic layers and adjacent to the third magnetic layer; and a second magnetic film disposed between the third and fourth nonmagnetic films and touching the third and fourth nonmagnetic films;

each of the first, second, third and fourth nonmagnetic films is made of copper;

each of the first and second magnetic films is made of a cobalt-manganese alloy, and has a thickness greater than zero and smaller than or equal to 0.5 nm;

each of the first, second, third and fourth nonmagnetic films has a thickness greater than zero and smaller than or equal to 0.5 nm; and each of the first, second and third magnetic layers has a thickness that falls within a range of 1 to 2 nm, inclusive.

* * * * *